Oct. 24, 1950 S. KELLOGG, II., ET AL 2,526,669
PICK-OFF FOR ELECTRICAL CONTROL SYSTEMS
Original Filed Feb. 13, 1942
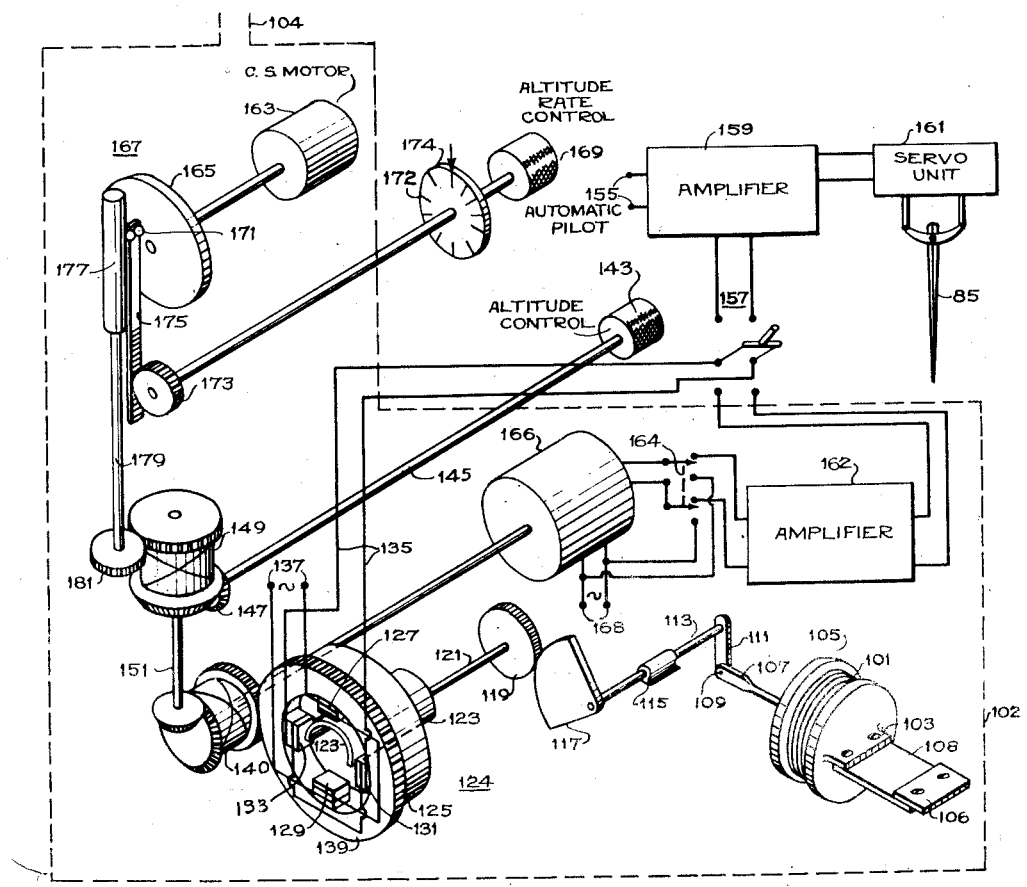
INVENTORS
SPENCER KELLOGG, 2ND
GERALD N. HANSON
BY Herbert H. Thompson
ATTORNEY Patented Oct. 24, 1950

2,526,669

UNITED STATES PATENT OFFICE 2,526,669

PICK-OFF FOR ELECTRICAL CONTROL SYSTEMS

Spencer Kellogg, 2nd, and Gerald N. Hanson, Glen Head, N. Y., assignors to The Sperry Corporation, a corporation of Delaware Original application February 13, 1942, Serial No. 430,736. Divided and this application March 10, 1945, Serial No. 582,134

4 Claims. (Cl. 318—31)

1

The present invention is concerned with pick-offs or control signal generators which are adapted for controlling servomotors of positioned or follow-up control systems, including systems for the simultaneous control of aircraft altitude, automatic level flight and constant rate of climb or glide control, described and claimed in a copending application now U. S. Patent No. 2,415,429, dated February 11, 1947, for Aircraft Altitude Control, of which this application is a division.

It is an object of the present invention to improve such signal generators or pick-offs, which are usually of the alternating current type and control reversible servo or follow-up motors, so that such pick-offs remain operative to control the motor throughout a 360 degree difference in rotation of the controlling and controlled elements. More particularly, our invention is an improvement of the "E" type of alternating current transformer pick-off, such as shown, for instance, in the prior patent to Wittkuhns, No. 1,921,983, dated August 8, 1943, for Follow-up Device for Gyro Compasses in which control is lost if the controlling and controlled elements are separated more than a few degrees in their angular relationship.

A still further object of the present invention is to provide improved electrical pick-offs including means for zeroizing when not in use.

Further objects and advantages of the present invention will be apparent from the attached specification and drawings in which, The single figure shows one embodiment of the system of the invention.

Referring to the drawings, there is shown the system of the invention as applied to an electrically controlled servo system for automatically controlling aircraft, such as shown in U. S. Patent No. 2,398,421 for Electro-Hydraulic Servo System, issued on April 16, 1946, in the name of C. A. Frische, G. P. Bentley, and P. Halpert. This patent shows an automatic pilot system in which a reversible-phase, variable magnitude, alternating signal voltage is produced corresponding to a desired control action. This signal voltage is then amplified and actuates, a suitable electrical or hydraulic servo system, whereby the craft controls are operated in direction and extent in accordance with the phase and magnitude of the signal voltage. Although the prior applications were disclosed primarily with respect to rudder control, it will be clear that the same control systems may be used for elevator or aileron control of aircraft, or for the control of a servo or

2 follow-up motor for any purpose. In the present invention such a system is used for the elevator control, whereby the altitude of the craft may be suitably controlled.

In the drawings, reference numeral 101 shows a sealed bellows type of barometric unit which, as is well known, will expand or contract in accordance with the pressure to which it is subjected. Barometric unit 101 is preferably not completely exhausted but left with a very small remaining air pressure of the order of a few millimetres of water, being just sufficient to compensate for the effect temperature changes in expanding and contracting the bellows 101 and the housing and mounting of the unit to be described, and thereby rendering the unit independent of temperature, as will be described.

This unit is entirely enclosed in an air tight housing indicated generally by dotted line 102, which is connected as by a duct 104 to a source of Pitot static pressure whereby the bellows 101 is subjected to only the static air pressure outside the craft and accurately indicates by its expansion the altitude of the craft. One end 103 of the bellows is fixed to the craft as at 106 by means of a flat spring 108. The other end 105 of bellows 101 is attached to a link 107 which is thereby translated in accordance with the altitude of the craft. Link 107 is pivotally connected as at 109 to a crank arm 111 which is rigidly fastened to a shaft 113 journalled in a bearing 115 fixed to the craft. Spring 108 permits the necessary deviation of shaft 107 as the bellows expands and contracts, but is stiff enough to transmit the expansion of bellows 101 to shaft 107. Fastened to the shaft 113 is a gear sector 117 meshing with a pinion 119 fixed to a shaft 121.

Shaft 121 actuates the sensitive element of a pick-off device 124, shown as an armature member 123 formed as a semi-cylinder of magnetic material. Coaxial with shaft 121 and pick-off armature member 123 is the pick-off housing 125 containing four field poles symmetrically located, each having wound thereon a coil such as coils 127, 129, 131 and 133, respectively. These poles are equally spaced about the axis of the pick-off device, one pair of opposite coils 131 and 133 being connected in opposing series relation to output wires 135 while the remaining pair of coils 127 and 129 are energized from a suitable source 137 of alternating current in such manner as to simultaneously provide like magnetic poles.

It will be clear that with pick-off armature 123 in the central and symmetrical position shown in the drawings, equal voltages will be induced in pick-up coils 131 and 133, resulting in zero voltage across output wires 135. If pick-off armature 123 is displaced from the position shown in either direction the voltage induced in one of coils 131, 133 will be greater than in the other and the resulting unbalance will appear as a variable magnitude reversible phase alternating voltage across output wires 135.

Pick-off 124 therefore acts to convert the relative displacement between armature 123 and housing 125 into an alternating signal voltage corresponding in phase to the sense of this displacement and in magnitude to the magnitude of the displacement. The relation between signal magnitude and displacement magnitude may be made to have any desired form, as by suitably forming the pole faces of housing 125. If these pole faces are formed cylindrically and concentric with the axis of armature 123, the signal will vary linearly with angular displacement until the armature 123 clears the poles. Thereafter, the signal will remain substantially constant with increased displacement. If the pole faces are formed flat, as shown, the signal will increase more rapidly for small displacements, and will asymptotically approach the substantially constant value for large displacements. Other forms may be used, suited to the particular use of the pick-off, which is in no way restricted to the use here shown.

It will also be clear that the voltage appearing across output terminals 135 will maintain the same phase during displacements of pick-off armature 123 in either direction from the central position up to 180 degrees in magnitude, so that for a full 360 degrees of rotation of armature 123, a useful voltage output will be obtained from this device. However, where it is not necessary to provide more than 90 degrees of useful control signal, one of the two energizing poles may be eliminated.

The output signal voltage appearing between output wires 135 is used as a control voltage for the aircraft elevators 85 in the same manner as shown in the above-mentioned Patent No. 2,398,421. As is therein shown, the reversible phase variable magnitude signal voltage, such as the voltage appearing between wires 135 is fed to a suitable phase sensitive amplifier and rectifier 159 whose output controls an electrical torque motor and/or an electrical or hydraulic servomotor unit 161 to actuate the elevators 85 of the craft to effect a change in altitude. It will be understood that with the switch 157 in the up position the signal voltage appearing between wires 135 may be combined without or within the amplifier 159 with the signal voltage from the automatic pilot so that the altitude control signal will be in continuous operation through the automatic pilot controls. This action will continue until the altitude has changed by such an amount that the expansion or contraction of bellows 101, operating through magnifying linkage 107, 111 and gearing 117, 119 has restored pick-off armature 123 to a central or balanced position with respect to pick-off housing 125 and its coils, at which time the signal across terminals 135 disappears and the elevators 85 return to their centralized position. Thereafter, the craft will maintain constant altitude, as any change in altitude will at once operate to drive the craft back to its original altitude.

Since shaft 121 is actuated directly from bellows 101, it will be clear that its position is indicative of the craft altitude. Hence, a suitable altitude indicator could be actuated directly from this shaft. Also, since pick-off housing 125 is caused to follow-up pick-off armature 123 which is connected to shaft 121, its position also is indicative of altitude, and a suitable indicator may be provided therefor.

In order to permit adjustment of the automatic constant altitude control just described, housing 125 has formed on or fixed to the outside thereof a gear 139 and may be positioned from an altitude control 143, as by way of shaft 145, gear 147, differential 149, shaft 151 and differential 149.

In operation, the operator will set the housing 125 in the position corresponding to the desired altitude as by means of altitude control knob 143. If the craft is not already at this altitude, pick-off armature member 123 will not be centralized with respect to housing 125 and accordingly a voltage will be produced across terminals 135 corresponding to the desired sense of change of altitude and corresponding in magnitude, at least up to the maximum output of the pick-off device, to the desired amount of change of altitude. This signal voltage appearing across terminals 135 will operate as described above to reposition the craft in altitude until bellows 101 recentralizes armature 123. The maximum signal output of pick-off 124 may be chosen so that the resultant actuation of the craft elevators will not produce too steep a change in altitude.

If a constant rate of climb or glide is desired, this may be provided by continuously rotating pick-off housing 125 at a constant rate. When this is done, the craft, as described above, is controlled to change its altitude to maintain pick-off armature 123 centralized with respect to housing 125 and hence the craft must continuously rotate shaft 121 by changing its altitude at the same rate as housing 125. Such a constant rotation of housing 125 is obtained from a constant speed motor 163, which drives a disc 165 forming a part of a ball and disc type of variable speed drive 167. Cylinder 177 is connected to a shaft 179 and by way of a gear 181 to the third member differential 149, and thence to housing 125. By this means pick-off housing 125 is continuously rotated at constant speed from constant speed motor 163, the speed of rotation depending upon the setting of ball carriage 171 by means of an altitude rate control 169. It will be clear that any other suitable type of variable speed drive may be used here, such as that shown in copending application Serial No. 428,030 now patent No. 2,526,665, dated October 24, 1950, filed January 24, 1942, in the names of H. L. Hull. R. C. Goertz, and W. C. Hartman for Positioned Control System. There is thus provided a climb and glide control having adjustable constant rates of climb or glide, which may be indicated on the altitude rate dial 172 cooperating with a fixed index 174 and rotated by altitude rate control 169.

It will be seen that the motion of arm 107 connected to bellows 101 will not vary linearly with altitude because of the non-linear variation of atmospheric pressure with altitude. In order that the same sensitivity of control may be obtained at different altitudes and in order that the rate of climb or glide produced in the manner just described be constant over wide ranges of altitude, non-linear linkage 107, 111 is provided, being in effect an eccentric connection, and providing the proper non-linear motion of shaft 107 with respect to altitude to result in a linear rotation of shafts 113 and 121 with altitude over a wide range of altitudes.

The purpose of the slight air pressure left in bellows 101 should now be clear. Thus, temperature effects will cause expansion or contraction of the casing 102 housing the system, so that the separation, for instance, of bracket 115 and fixed support 106 of bellows 101 will vary, as will the bellows 101 due to change in size of its metal container. Such action would produce an apparent rotation of shaft 113 with respect to bracket 115, and would therefore effect a change of position of pick-off armature 123, and the craft would change its altitude in the manner described. To prevent this action, a slight amount of air is left within bellows 101 so that temperature changes will cause an increase or decrease of pressure within the bellows 101, resulting in the slight extension of retraction just necessary to compensate for the effect of the expansion or contraction of casing 102 and bellows 101 just described. The system is thereby effectively compensated against temperature effects.

In order to prevent too great and too sudden a change in altitude upon first activating the automatic altitude control, it is desirable to maintain pick-off armature 123 continuously centralized with respect to pick-off housing 125 when the altitude control is not in use, so that activation of the altitude control will merely result in automatic level flying at the attained altitude. One manner of producing this result is included in the drawings. Thus, the output signal voltage appearing between wires 135 is connected to a double-pole double-throw switch 157. In its upper position, this switch connects the signal voltage to amplifier 159 to control the elevators 85 in the manner already described. In the lower position of switch 157, the signal voltage is now connected instead through an amplifier 162 of any suitable type and double-pole double-throw switch 164 (when in the up position) to a motor 166 connected to rotate housing 125, through the third member of differential 140. Motor 166 is illustrated as being of the two phase induction type, having one field winding energized directly from a source 168 of alternating current and its second field winding fed from the output of amplifier 162 when switch 164 is in the up position. Suitable means are provided either in amplifier 162 or motor 166 to insure that the energizations of the two windings will be in phase quadrature. It will be clear that any suitable type of reversible motor 166 may be used; if a D. C. motor is used, the output of amplifier 162 should then provide reversible polarity D. C. output.

The system described provides in effect a closed follow-up system whereby the motor 166 continuously drives pick-off housing 125 to follow the position of pick-off armature 123 as altitude changes. In this way, when the craft, for instance, first takes off, with the automatic altitude control unenergized, the pick-off 123 is kept continuously centralized or zeroed so that, after attaining any desired altitude, the operator may immediately actuate the altitude control merely by throwing switch 157 from the down to the up position, and thereby have the automatic altitude control at once take over and maintain the attained altitude of the craft without any sudden changes.

When switch 164 is in the down position, motor 166 is energized directly from power source 168, and will rotate continuously, thereby rotating pick-off housing 125. This provides an altitude control equivalent to control 143, but now power-operated. Switch 164 may be positioned at any suitable control point, remote from the entire apparatus, if desired. It may be made as a switch biased or normally in the up position and momentarily operable to the down position by the operator to cause a change of altitude when the automatic pilot is in operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrical pick-off device comprising a housing four field poles symmetrically and radially disposed within said housing, a winding upon each of said poles, a semi-cylindrical magnetic armature member having its axis symmetrically disposed with respect to said poles, means for energizing one opposed pair of said windings by alternating current in such manner that the pair of poles corresponding to said pair of windings simultaneously exhibit like magnetic polarity, and means for connecting said other pair of windings in series opposition whereby there is produced across said series connected windings a reversible-phase variable magnitude alternating signal voltage corresponding in phase and magnitude to the sense and magnitude of the relative displacement between said armature and said housing.

2. An electrical pick-off device as in claim 1 further comprising means for rotating said housing independently of said armature.

3. An electrical pick-off device comprising a housing, four field poles symmetrically and radially disposed within said housing, coil windings on the poles, a semi-cylindrical magnetic armature member coaxial with said poles, means for opposite A. C. energization of one opposed pair of said field pole windings, and output means oppositely connected to the windings of the other opposed pair of poles whereby there is produced in said output a reversible-phase variable magnitude alternating signal voltage corresponding in phase and magnitude to the sense and magnitude of the relative displacement between said armature and said housing, through a complete rotation of the armature and housing.

4. In a follow-up system having a sensitive and a follow-up element, a two-part electric pick-off device, one part being rotatable from said sensitive element and the other from said follow-up element, one part comprising a rotatable housing, four field poles symmetrically and radially disposed within said housing, coil windings on the poles, the other part comprising a semi-cylindrical magnetic armature member coaxial with said poles, means for opposite A. C. energization of one opposed pair of said field pole windings, a servo motor for driving said follow-up element and one of said parts of said pick-off from the reversible phase variable magnitude alternating signal voltage supplied thereto from the differential output of the second pair of field windings.

SPENCER KELLOGG, 2ND.
GERALD N. HANSON.

(References on following page)

REFERENCES CITED

The following references are of record in the file of this patent:

UNITED STATES PATENTS

| Number | Name | Date |
|---|---|---|
| 1,921,983 | Wittkuhns | Aug. 8, 1933 |
| 2,053,409 | Urfer | Sept. 8, 1936 |
| 2,415,819 | Halpert et al. | Feb. 18, 1947 |

FOREIGN PATENTS

| Number | Country | Date |
|---|---|---|
| 555,042 | Germany | July 19, 1932 |